United States Patent [19]

Merrill et al.

[11] 4,229,777

[45] Oct. 21, 1980

[54] HIGH VOLTAGE DUAL DIELECTRIC CAPACITOR ROLL

[75] Inventors: Richard C. Merrill; Richard G. Conners, both of Glens Falls, N.Y.

[73] Assignee: General Electric Company, Hudson Falls, N.Y.

[21] Appl. No.: 969,658

[22] Filed: Dec. 15, 1978

[51] Int. Cl.³ .............................................. H01G 4/22
[52] U.S. Cl. ................................. 361/314; 361/273; 361/304; 361/313
[58] Field of Search ................ 361/313, 314, 273, 304

[56] References Cited

U.S. PATENT DOCUMENTS

| | | | |
|---|---|---|---|
| 3,253,199 | 5/1966 | Cozens | 361/313 |
| 3,278,816 | 10/1966 | Gaenge et al. | 361/273 |
| 3,457,478 | 7/1969 | Lehrer | 361/304 |
| 3,699,410 | 10/1972 | Maylandy | 361/313 X |
| 3,987,348 | 10/1976 | Flanagan | 361/314 X |
| 4,121,274 | 10/1978 | Simson | 361/273 |

FOREIGN PATENT DOCUMENTS 882815 11/1961 United Kingdom ...................... 361/273

*Primary Examiner*—E. A. Goldberg
*Attorney, Agent, or Firm*—J. J. Lichiello

[57] ABSTRACT

A medium high voltage capacitor roll section comprises a sheet of double metallized plastic film and a sheet of paper adjacent thereto, with the paper and film forming parallel dielectrics. A dielectric liquid impregnant is used and the roll is wound sufficiently tightly so that after impregnation with a dielectric liquid impregnant and consequent swelling there is an essentially zero negative space factor within the roll.

9 Claims, 4 Drawing Figures

HIGH VOLTAGE DUAL DIELECTRIC CAPACITOR ROLL

BACKGROUND OF THE INVENTION

This invention relates to capacitors, and, more particularly, to a medium to high voltage liquid impregnated, dual dielectric capacitors.

The predominant trends in the electrical and electronic industries are toward smaller sized and lower cost devices and components. Particular effort in this regard has been required by electrical equipment manufacturers who use capacitors because capacitors are frequently large and bulky components in a particular piece of electrical apparatus. Additionally, from the viewpoint of the capacitor manufacturer, these aims freqently conflict. For example, if a capacitor is to be made smaller, yet maintain equivalent voltage and capacitance ratings, these conditions may dictate the use of more costly dielectric materials.

A prior solution to such problems as noted, was to use different solid dielectrics in the same capacitor roll such as paper and plastic films, each forming in conjunction with electrodes, a separate capacitor or parallel capacitor section. In order to take advantage of the self healing properties of metallized layer electrodes, the paper strip was metallized to serve as one electrode and aluminum foil served as the other electrode. Very thin plastic films were used as the other dielectric. In spite of these improvements, demand continues for smaller, more efficient capacitors for motor starting and running applications.

A principal object of this invention, therefore, is to provide an inexpensive, relatively small, high capacitance roll which at the same time is capable of withstanding substantial voltage stress.

SUMMARY OF THE INVENTION

This invention is exemplified by a medium to high voltage capacitor in the range of about 250 to 440 volts AC, including an elongated sheet of plastic film with a layer of metallization on each side thereof but with opposite margin areas free of metallization. One or more sheets of very thin paper are placed adjacent the plastic film and the combination is then tightly wound to form a capacitor roll. When this film is used in a capacitor roll, metal schooping of the exposed edges of the roll provides electrical contacts and the paper and the film form parallel dielectrics with the metallized electrodes, i.e., that between one pair of electrodes the plastic foil is the sole dielectric, and between the next pair of electrodes the paper is the dielectric. By means of a very tight winding and a predetermined dielectric fluid, the windings can be made to withstand very high voltage stresses resulting in a smaller capacitor.

The roll is also wound to such a degree of tightness that there is insufficient room for the film (and to some extent the paper) to freely expand following impregnation by a dielectric liquid impregnant. Thus, the film expansion is limited by the tightness of the roll and there is essentially a zero space factor in the final roll. Space factor is the percentage of the volume of a capacitor roll not occupied by electrode or dielectric. By zero space factor it is meant herein that were the film allowed to freely expand, the final volume of the roll would exceed the overall initial volume of the roll before impregnation. Obviously the can or case in which the roll is contained serves as one boundary limit to the swelling. Limiting film expansion in this matter insures that voids and pockets of impregnant are substantially completely eliminated or filled with the impregnating fluid.

Preferably, the impregnant which is utilized has a relatively high dielectric constant to approximate the dielectric constant of the paper. Ester basic fluids are examples of fluids having higher dielectric constants. Preferably, an aromatic ester such as phthalate ester, e.g., 2 ethyl hexyl dioctylpthlate, is a good impregnant in the subject capacitor of this invention.

The particular combination described above provides high value ($<10$ $\mu f$) capacitors with paper dielectrics that are capable of providing long life at operating stresses in excess of 500 volts per mil on the paper. Such long life stresses on paper were not, previously, thought possible.

It is not certain why the subject capacitor is capable of withstanding in excess of 500 volts per mil operating stress on the paper. The capability relates to the use of a unique combination of materials and conditions. For example, no separate or integral metal foils are used and only a metallized layer on thermoplastic films serves as electrodes, thus taking advantage of the self-healing properties inherent in these electrodes. This is important because the capacitor is able to use a single sheet of paper due to the extraordinarily high voltage capability of the paper as used in this invention. In prior capacitors, the use of a single sheet of paper increased the chances of a pinhole or other manufacturing defect appearing in the paper dielectric resulting in electrical shorting of the capacitor. A metallized electrode provides self healing protection in these cases. Furthermore, the film is metallized on both sides to increase the self healing characteristics for both film and paper defects. The alternative is to apply metallization to the paper but if done, would cause an inappropriate number of faults and self healing actions would become ineffective. Furthermore, maintaining the paper free of metallization enhances the impregnation of the roll. Also, it is well known in the art that filling air pockets or voids with impregnant helps to prevent corona and to increase the voltage capability of a capacitor. However, by eliminating larger pockets of the impregnating fluid still further increases the voltage capability of a capacitor. It is felt that the zero space factor concept employed herein which is maintained in the final capacitor substantially completely eliminates pockets of impregnating fluid and thus enhances the voltage capability of the device.

DESCRIPTION OF THE DRAWINGS

These and other features and objects of the present invention will become more apparent upon a review of the following description taken in conjunction with the accompanying drawings wherein.

DESCRIPTION OF THE PREFERRED EMBODIMENTS

Figure 1:
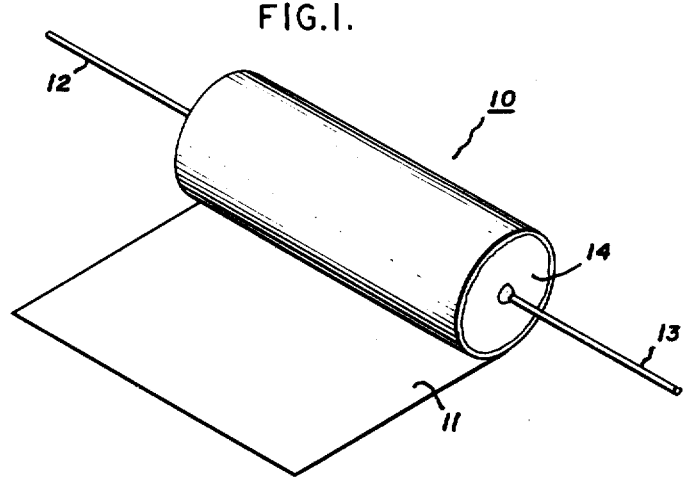
FIG. 1 is an isometric view of a partially unrolled capacitor roll.

Referring first to FIG. 1, there is shown an exemplary capacitor roll 10 of this invention which is partially unrolled. Roll 10 consists essentially of a multi strip laminate 11, to be described in detail below, which is rolled in convolute form. Terminal leads 12 and 13 are connected to schooped contacts on opposite ends of the roll 10. Only one schooped contact 14 is visible in FIG. 1.

Figure 2:
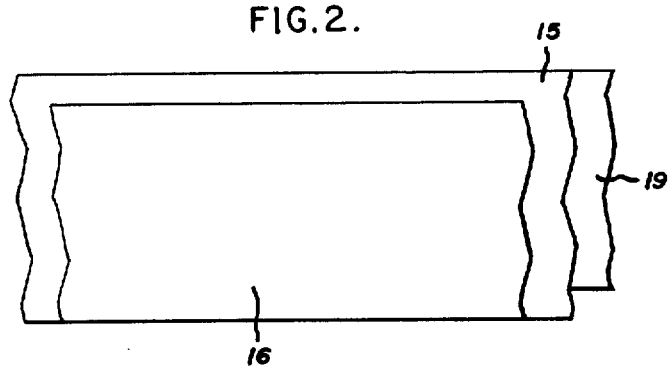
FIG. 2 is a plan view of a portion of an elongated metallized plastic film.
Figure 3:
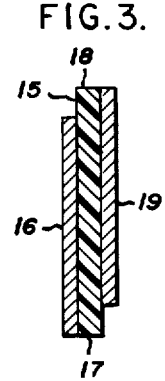
FIG. 3 is a sectional elevation view of the film of FIG. 2.

Laminate 11 consists of two parts. First, as illustrated in FIGS. 2 and 3, there is an elongated sheet of plastic film 15 which may be preferably, for example, a polyester such as Mylar resin film, but may also be other synthetic resin materials including the polyolefins such as polypropylene. A first layer of metallization 16 on a first side of the film 15 extends to a first longitudinal edge 17 of the film. The first layer of metallization 16 is spaced from the second longitudinal edge 18 of film 15.

As shown best in FIG. 3, a second layer of metallization 19 on the second side of the film extends to the second longitudinal edge 18 thereof, but is spaced from the first longitudinal edge 17 thereof. As is well known in the capacitor art, such offset spacing of capacitor metallization facilitates the use of schooped contacts or other metal joining procedures used at the roll ends.

Figure 4:
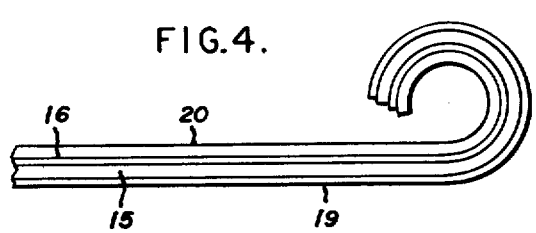
FIG. 4 illustrates schematically how the film of FIGS. 2 and 3 is used to form the subject capacitor roll.

Referring now to FIG. 4, there is shown schematically how the film 15 is rolled to form the capacitor roll 10. A sheet of commercially available capacitor (Kraft) tissue (paper) 20 is placed substantially coextensive with and adjacent to the plastic film 15. Next, the laminate is tightly wound to form a capacitor roll 10 (FIG. 1). The winding process is schematically illustrated in its beginning stages at the right hand portion of FIG. 4. The roll is made tight enough that when the device is finally impregnated and the film swells, the swelling of the film is restricted by the tightly wound roll, thus creating a "zero space factor" as defined above. The tight winding and zero space factor are best accomplished in a cylindrical capacitor roll which is contained within a cylindrical can or casing. In this connection the roll 10 may be wound on a solid core which is left in the roll section, as described in U.S. Pat. No. 3,987,348, Flanagan. Swelling of synthetic resin films such as polypropylene films by impregnants such as chlorodiphenyl is disclosed in U.S. Pat. No. 3,363,156, Cox, and plasticising of these films by esters are disclosed in U.S. Pat. No. 3,754,173, Eustance, both of which are assigned to the same assignee as the present invention. Swelling usually involves impregnating a capacitor at elevated temperatures so that the plastic film absorbs the impregnant. For example, polypropylene film absorbs as much as 11.0% by weight of chlorinated diphenyl in the 80° C. to 100° C. temperature range.

The plastic film usually has a dielectric constant of approximately 2 and the kraft papers used in capacitors have dielectric constants of approximately 4. In order to match the paper, it is preferable that the impregnant used has a relatively high dielectric constant above about 3. Ester base fluids thus make excellent impregnants for the subject capacitor. For example, the branch chain aromatic esters, as noted in the above Eustance patent and also U.S. Pat. Nos. 3,833,978 and 3,925,221, Eustance describe in detail the use of 2 ethyl hexyl phthalate ester.

Capacitor rolls manufactured as described above, supplied with schooped contacts and packaged in a conventional manner, have been found to exhibit excellent characteristics. In addition, the voltage stress capability of the paper exceeds 500 volts per mil, thus enabling high voltage, high capacitance rolls to be made quite small.

In order to equally stress the paper and the plastic film, the ratio of the thickness of the plastic to the thickness of the paper should approximately equal the ratio of 500 (the minimum voltage stress expected of the paper) to the voltage stress of the plastic. Inasmuch as the plastic typically exhibits a voltage stress capability in excess of 1250 volts per mil, the thickness ratio of the plastic to the paper should be approximately 1:2.4.

In one example of the practice of this invention, several round roll capacitors were made up using 0.32 mil strips of polypropylene film aluminum metallized on both sides, together with two strips of 0.40 mil paper. The strips were wound on 0.375 inch diameter polypropylene cores which were retained within the roll. Design stresses (at 440 volts AC) were 1375 volts per mil for the polypropylene and 550 volts per mil for the paper. The capacitors were vacuum dried and impregnated with epoxide stabilized 2 ethyl hexyl phthalate according to the Eustance patents. Twelve such capacitors were placed on accelerated life test at 585 volts AC and 80° C. with no failures in 500 hours.

Other examples of this invention include capacitors were made up as in the above example with some variation in dielectric thickness, the principle difference being that castor oil was used as the impregnant. Another example utilized 0.40 mil thick polypropylene and two sheets of 0.40 mil thick paper.

This invention thus describes a dual dielectric capacitor where both dielectrics are a part of the dielectric system, and one of the dielectrics is a porous material such as paper. By winding such a roll to zero space factor, the design thicknesses of the dielectric strips may be chosen to exceed about 500 volts per mil thickness of the paper whereas the synthetic resin film is stressed at greater than about 1000 volts per mil thickness. The capacitor of this invention is most applicable in the range of 250 volts AC to about 440 volts AC.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A round roll capacitor having a rating from about 250 volts AC to about 440 volts AC comprising:
   (a) a casing,
   (b) a capacitor roll in said casing comprising an elongated sheet of plastic film having a first layer of metallization on a first side thereof, said first layer extending substantially to a first longitudinal edge of said sheet and being spaced from a second longitudinal edge of said sheet, said sheet of film having a second layer of metallization on the second side thereof, said second layer extending substantially to said second longitudinal edge of said sheet and being spaced from said first longitudinal edge;
   (c) one or more sheets of metallization free paper substantially adjacent to said film;
   (d) a round core in said roll on which said sheets of film and paper are tightly rolled to form a capacitor roll wherein the film and the paper are in the dielectric field;

(e) an impregnant having a dielectric constant above about 3 in said roll; and (f) said impregnated roll having essentially a zero space factor after impregnation and the design voltage stress on said paper is above about 500 volts per mil thickness and above about 1000 volts per mil thickness on said film.

2. A capacitor according to claim 1 wherein said impregnant comprises an ester.

3. A capacitor according to claim 1 wherein said ester comprises an aromatic ester.

4. A capacitor according to claim 1 wherein said ester includes an epoxide stabilizer.

5. A capacitor according to claim 1 wherein said plastic film is polypropylene.

6. A capacitor according to claim 1 wherein said plastic film is polyethylene terephthalate.

7. A capacitor according to claim 3 wherein said impregnant is 2 ethyl hexylpthlate.

8. A capacitor according to claim 7 wherein the ratio of thicknesses of said plastic film and said paper is approximately equal to the ratio of 500 to the voltage stress capability of said plastic film in volts per mil.

9. A capacitor according to claim 8 wherein said ratio of dielectric thickness of the plastic to the paper is approximately 1:2.4.

* * * * *